(12) United States Patent
Chahal et al.

(10) Patent No.: US 10,929,620 B2
(45) Date of Patent: Feb. 23, 2021

(54) HARMONIC RFID TAG-READER SYSTEM FOR LONG RANGE SENSING IDENTIFICATION AND SECURITY

(71) Applicant: Board of Trustees of Michigan State University, East Lansing, MI (US)

(72) Inventors: Premjeet Chahal, Okemos, MI (US); Saikat Mondal, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 0 days.

(21) Appl. No.: 16/420,711

(22) Filed: May 23, 2019

(65) Prior Publication Data

US 2019/0362110 A1 Nov. 28, 2019

Related U.S. Application Data

(60) Provisional application No. 62/676,044, filed on May 24, 2018.

(51) Int. Cl.
*G06K 7/10* (2006.01)
*H04B 5/00* (2006.01)
*G06K 19/073* (2006.01)

(52) U.S. Cl.
CPC ... *G06K 7/10297* (2013.01); *G06K 19/07309* (2013.01); *H04B 5/0062* (2013.01)

(58) Field of Classification Search
CPC .................................................. G06K 7/10297
USPC .............................. 235/451; 340/505, 572.1
See application file for complete search history.

(56) References Cited

U.S. PATENT DOCUMENTS

| | | | |
|---|---|---|---|
| 9,455,769 B2 | 9/2016 | Tedjini et al. | |
| 2011/0169657 A1* | 7/2011 | August | A01K 11/004 340/854.6 |
| 2013/0130843 A1* | 5/2013 | Burroughs | G01S 13/82 473/415 |
| 2013/0194100 A1* | 8/2013 | Granhed | A63B 29/021 340/584 |
| 2015/0288424 A1* | 10/2015 | Tedjini | H04B 5/0081 455/41.1 |
| 2017/0098149 A1 | 4/2017 | Kesler et al. | |

* cited by examiner

*Primary Examiner* — Allyson N Trail
(74) *Attorney, Agent, or Firm* — Harness, Dickey & Pierce, PLC (57) ABSTRACT

A harmonic tag system includes a harmonic tag and a first antenna configured to receive a fundamental signal and transmit an identifier of the harmonic tag at a fundamental frequency. The harmonic tag system includes an energy harvesting unit configured to convert the fundamental signal into power. The power activates a sensor. The harmonic tag system also includes a harmonic doubler configured to generate a harmonic signal at a harmonic frequency based on (i) the fundamental signal and (ii) a sequence. The harmonic tag system further includes a digital modulation unit configured to selectively trigger an activation of the harmonic doubler. The harmonic doubler is triggered sequentially in an off state and an on state, and the digital modulation unit produces the sequence. The harmonic tag system also includes a second antenna configured to transmit data of the sensor at the harmonic frequency.

20 Claims, 10 Drawing Sheets

HARMONIC RFID TAG-READER SYSTEM FOR LONG RANGE SENSING IDENTIFICATION AND SECURITY

CROSS-REFERENCE TO RELATED APPLICATIONS

This application claims the benefit of U.S. Provisional Application 62/676,044, filed May 24, 2018. The entire disclosure of the above application is incorporated herein by reference.

GOVERNMENT SUPPORT CLAUSE

This invention was made with government support under DTPH56-15-H-CAP08 awarded by the U.S. Department of Transportation. The government has certain rights in this invention.

FIELD

The present disclosure relates to radio frequency identification (RFID) tags and, more specifically, transmitting data from RFID tags.

BACKGROUND AND SUMMARY

This section provides background information related to the present disclosure which is not necessarily prior art.

Radio frequency identification (RFID) tags allow the identification of a product or object. RFID tags are typically small, unobtrusive, and lightweight, making them ideal for applications such as product handling, logistics, and security. Passive RFID tags operate by utilizing radio waves transmitted by a reader or interrogator. Passive RFID tags convert waves from the interrogator into energy to, in turn, power the transmitter of the RFID tag and pass on information to the interrogator. Active RFID tags utilize a power source to perpetually transmit information.

Passive RFID tags are typically used in applications that require long lifetime and/or instances where the RFID tags are difficult to reach. For example, in various implementations, sensors are embedded into a system during deployment and are not accessible in the future. Further, the lifetime of the sensor can be increased by triggering it only during interrogation. Therefore, a passive type sensor integrated RF tag is more desirable in various implementations.

Passive RFID technologies have applications in multiple industries including transportation, e-payments, logistics and more. While these technologies have significant applications, current technologies are typically only convenient in situations where there is little to no interference between the RFID tag and interrogator. This is because when there are materials surrounding the RFID tag and interrogator, and the materials may strongly reflect back radio waves emitted by the interrogator, creating radio interference.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

A passive harmonic radio frequency identification (RFID) tag integrated with a remote sensor is configured to transmit sensor data as well as identification information, for example, a tag identifier (ID). For remote sensing, automation, and control, multiple sensors are being integrated into one device. To distinguish between different sensors, there is a need to integrate the identifier (ID)/IP address in the sensors. RFID systems are popular for separating different tags by IP address. A further layer is added to the RFID system by making the RFID system capable of sensing. In the present disclosure, a radio frequency (RF) system is proposed, which can communicate the sensing data from a sensor along with the embedded tag ID by tailoring the harmonic generation of a fundamental frequency in the tag.

To improve signal to noise ratio (SNR) of a received signal due to environment noise and multipath effect, a harmonic RFID system is proposed to make the RFID system more robust and increase the SNR. In harmonic radar systems, the RFID tag generates the harmonic of the interrogation signal and the interrogator reads back the signal.

The RF communication mechanism of smart sensors can be categorized broadly in two groups: (i) near-field communication and (ii) far-field communication. The RFID tag is mutually coupled in near-field communication at low frequencies (~10-20 MHz). Far-field harmonic RFID tags can go as high as 2.5 GHz. The medium of propagation for RFID communication decides the frequency of operation. For example, high frequency (for example, greater than 500 MHz) signals go through a huge propagation loss for underground or underwater communication. Again, the RFID tag antenna can be huge and the data rate would be slower at a low frequency of operation. Therefore, an optimization is required in deciding the frequency. The environment includes underground sensing, hazardous chemical sensing, and in-house smart sensors.

The technology of the present disclosure seeks to improve the use of RFID tags in two ways: (i) utilizing an RFID tag circuit design such that harmonic radio frequencies are transmitted instead of the same frequency of the interrogator and (ii) incorporating sensors into the RFID tag circuit design to allow for remote sensing of an environment. By transmitting harmonics of the interrogator frequency, interference as a result of material existing between the RFID tag and interrogator is significantly reduced as the interrogator will not pick up radio waves reflected by the interfering material. The RFID tag may be designed to emit multiple harmonic frequencies, allowing for multiple sources of information to be transmitted. These sensors may include: pH sensors, gasoline/water sensors, G-force recorders, etc. The present disclosure may be applied to systems for smart agricultural sensing (passively monitoring soil conditions), shipping/handling/logistics, and monitoring of pipelines.

Figure 1:
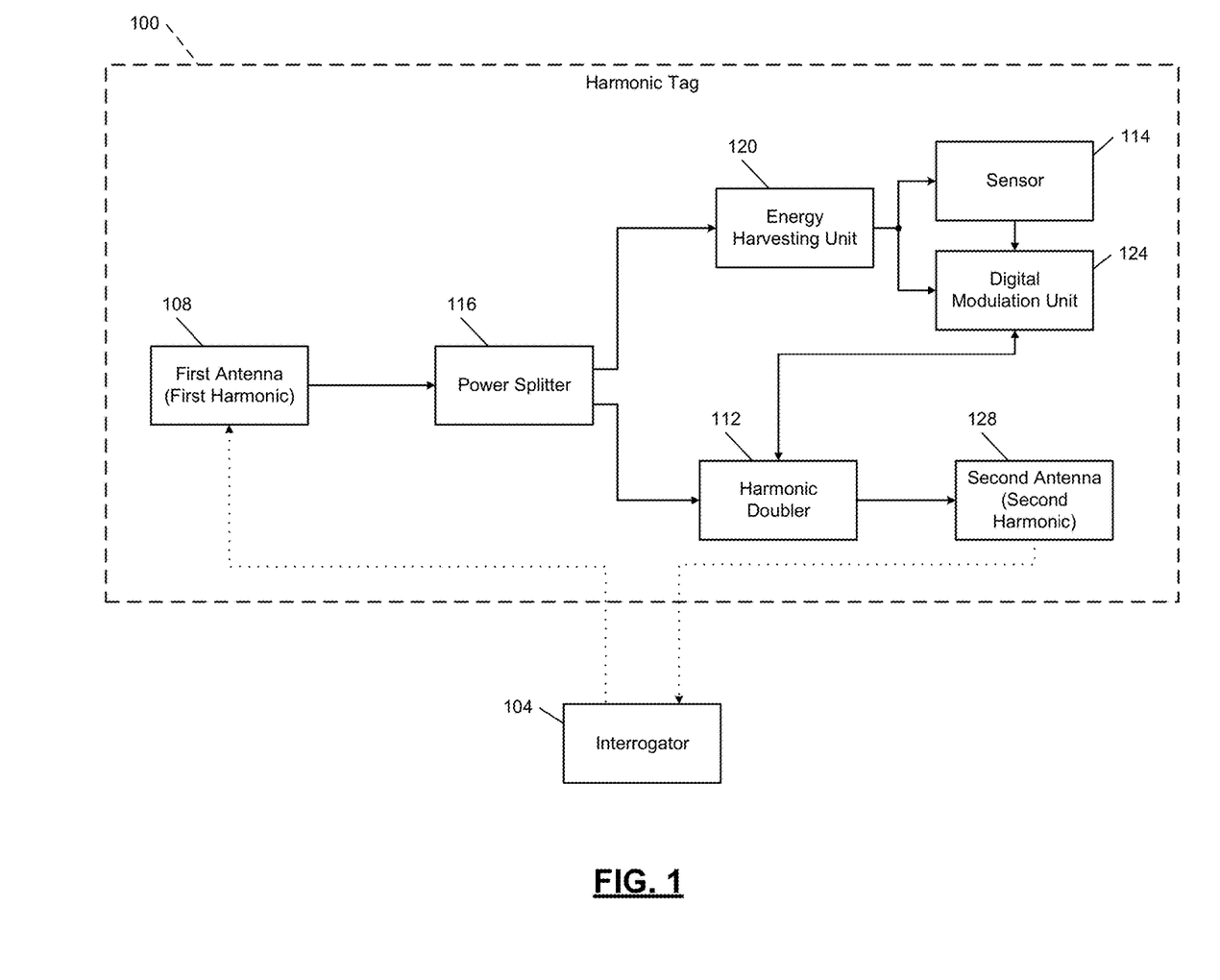
FIG. 1 depicts a functional block diagram of a harmonic RFID tag communicating with an interrogator.

FIG. 1 depicts a functional block diagram of a harmonic RFID tag 100 communicating with an interrogator 104. The RFID tag 100 includes a first antenna 108 and a harmonic doubler (HD) 112, for example, a non-linear transmission line (NLTL). The HD 112 generates a second harmonic of a received RF signal. The received RF signal is received via the first antenna 108 from the interrogator 104. In various implementations, the RFID tag 100 is implemented using an NLTL circuit design as the HD 112. The NLTL is modulated by the sensor signal and the associated sensor ID/IP address of a sensor 114. The RFID tag 100 also includes a power splitter (PS) 116, an energy harvesting unit (EHU) 120, a digital modulation unit (DMU) 124 (including a modulation unit and a non-volatile memory), and a second antenna 128. The RFID tag 100 can be integrated with any sensor whose output is specifically current or voltage. For example, in various implementations, the sensor 114 is connected to the EHU 120 and the DMU 124.

When the RFID tag 100 receives an RF signal, the EHU 120 converts the RF power into DC power, which activates the sensor 114 and the DMU 124. Once the sensor 114 is activated, the continuous analog output signal is converted to digital signal. The digital signal from the sensor 114 together with the previously stored IP address is fed into the DMU 124, which modulates the HD 112. At the modulation high state, the HD 112 generates strong second harmonics of the RF frequency, and at the modulation low state the HD 112 is inactivated. Thus, the RFID tag 100 transmits the coded signal at a second harmonic via the second antenna 128, which can be demodulated and read by the interrogator 104. Once the code is demodulated and read, the IP address together with the sensor data is obtained.

That is, the RFID tag 100 is tailoring the harmonic generation using the HD 112 to transmit an altered frequency, which is the second harmonic. Designing the harmonics at the RFID tag 100 results in the RFID tag conducting sensing using the sensor 114. In this way, the RFID tag 100 can transmit the sensor ID at the fundamental frequency sent by the interrogator 104 and send sensor data using the second harmonic or the harmonic signal generated at the RFID tag 100 from the fundamental, transmitted signal.

Moreover, the harmonic content of the second harmonic includes identifying unique information as each RFID tag has a unique harmonic signature. In this way, the RFID tags may be designed with a particular unique signature to prevent tampering with the harmonic data and/or to be confident in the data received by the interrogator 104. Further, the RFID tags may be designed to include watermarks for an added layer of security. An additional benefit of the RFID tag 100 of FIG. 1 is that converting power to DC prevents burning of the system, providing a layer of self-protection.

In various implementations, the interrogator 104 can transmit multiple frequencies where each frequency can carry additional information. In this way, the RFID tag 100 may generate multiple harmonics to transmit additional information, including additional sensor data.

Additionally, subharmonic frequencies $$\left(\frac{f_0}{2}, \frac{f_0}{3}, \text{etc.}\right)$$

can also be generated along with harmonic frequencies. In practice, DC biasing a varactor diode 316 at its negative resistance region generates the subharmonic frequency. Subharmonics along with the harmonics transmit additional information, including additional sensor data.

The PS 116 divides the input power in two parts: (i) for energy harvesting in EHU 120 and (ii) for doubling of the fundamental signal ($f_0$) in HD 112. The RFID tag 100 operates in continuous mode, which harvests and transmits the ID simultaneously contrary to a first harvest then transmit RFID architecture. Once the EHU 120 harvests the required energy, the EHU 120 activates the DMU 124, which triggers the HD 112 'off' and cony sequentially. In various implementations, a simple amplitude shift keying (ASK) based modulation is adopted for the triggering. Based on the 'off' and cony sequence of the DMU 124, the HD 112 generates a harmonic signal. The interrogator 104 identifies the tag ID by reading only the harmonic signal.

The first antenna 108 is one factor that determines the size of the RFID tag 100. The first antenna size is hugely affected by the operating frequency. For underwater or underground applications, the signal undergoes a huge amount of loss at high frequencies. Hence, low frequency communication at lower than 1 GHz is necessary for those applications. For low frequency operation, the antenna size would increase. Several antenna designs are available such as meandered dipole antenna or loop antennas for small size implementation at low frequency. Alternatively, slot and patch antennas are a good choice for operation at more than 2 GHz. Therefore, the RFID tag size is dependent on the application. Additionally, in various implementations, dual band antenna implementations may be used to receive the fundamental signal and transmit its fundamental. For a low impedance antenna, the series connected antenna implementation is required for dual frequency operation. Alternatively, for a high impedance antenna, the dual band antennas are to be connected in parallel. In various implementations, a dual band antenna is preferred over a single wide band antenna to avoid unwanted signal/noise reception.

Figure 2:
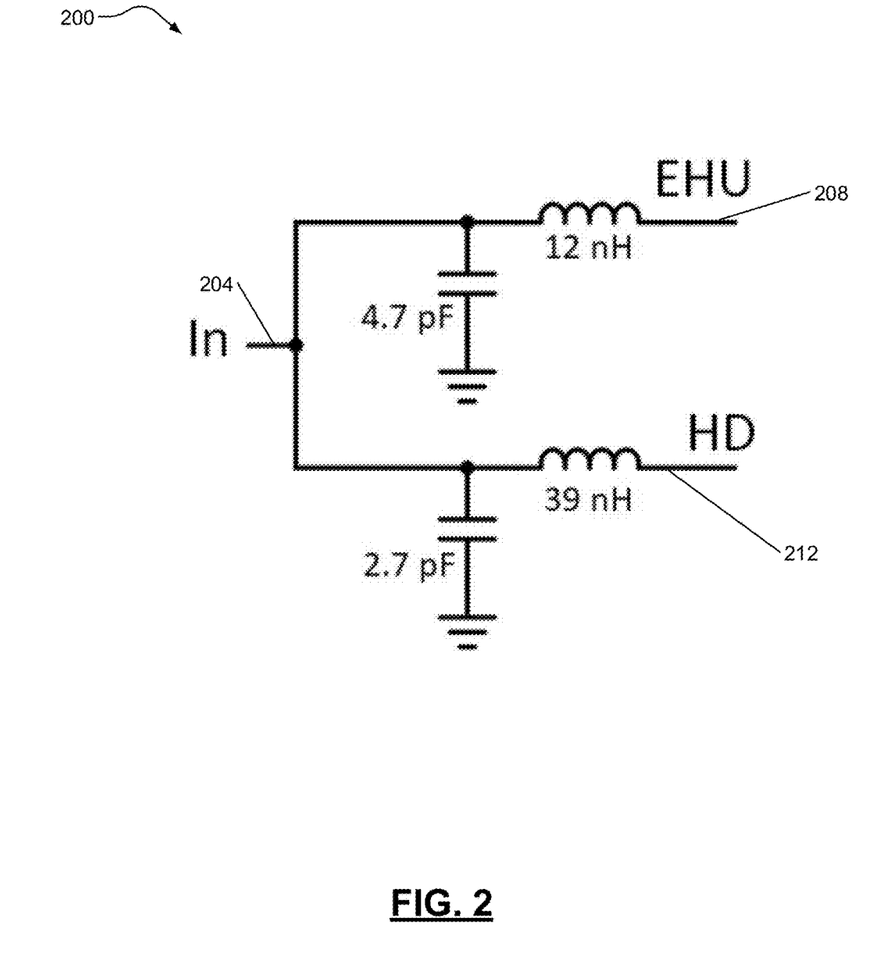
FIG. 2 is a schematic of an example power splitter of an RFID tag.

FIG. 2 is a schematic of an example PS 200. The RFID tag was designed to operate in continuous mode, which means the RFID tag would send the ID data continuously instead in the form of digital pulses like conventional RFID. In this mode, the DMU and HD need to operate simultaneously. Therefore, the PS 200 was implemented to divide a received power or input power 204 into two parts. The first part is harvested in EHU 208 and to power up the DMU. The second part provides the fundamental input signal to the HD 212.

The PS 200 divides the input power 204 equally in two output branches. However, the power requirement of DMU and HD 212 is different. Therefore, initially the DC power consumption of each unit is measured for varying input power. The harvested DC power may be calculated from the efficiency of the Schottky diode for varying input power 204. For example, the DMU, connected to the EHU 208, can consume a constant 32.5 µW, irrespective of the input power 204. However, the power consumption of HD 212 is dependent on the input power 204. The total power consumption is the addition of HD 212 and DMU. The RFID tag can only operate properly when the harvested power is more than total power consumption. The DMU requires more power compared to the HD 212. When the power provided to the DMU and the HD 212 is equal, the PS 200 divides input power equally in the EHU 208 and HD 212. When the power provided to the DMU and the HD 212 is not equal, the EHU 208 receives 6 dB more power compared to the HD 212. Unequal power splitting activates the RFID tag at 3 dB lower power compared to equal power splitting. However, if the power difference between the EHU 208 and HD 212 is increased, the output harmonic signal strength drops without significantly reducing the minimum RFID tag activation power.

Figure 3:
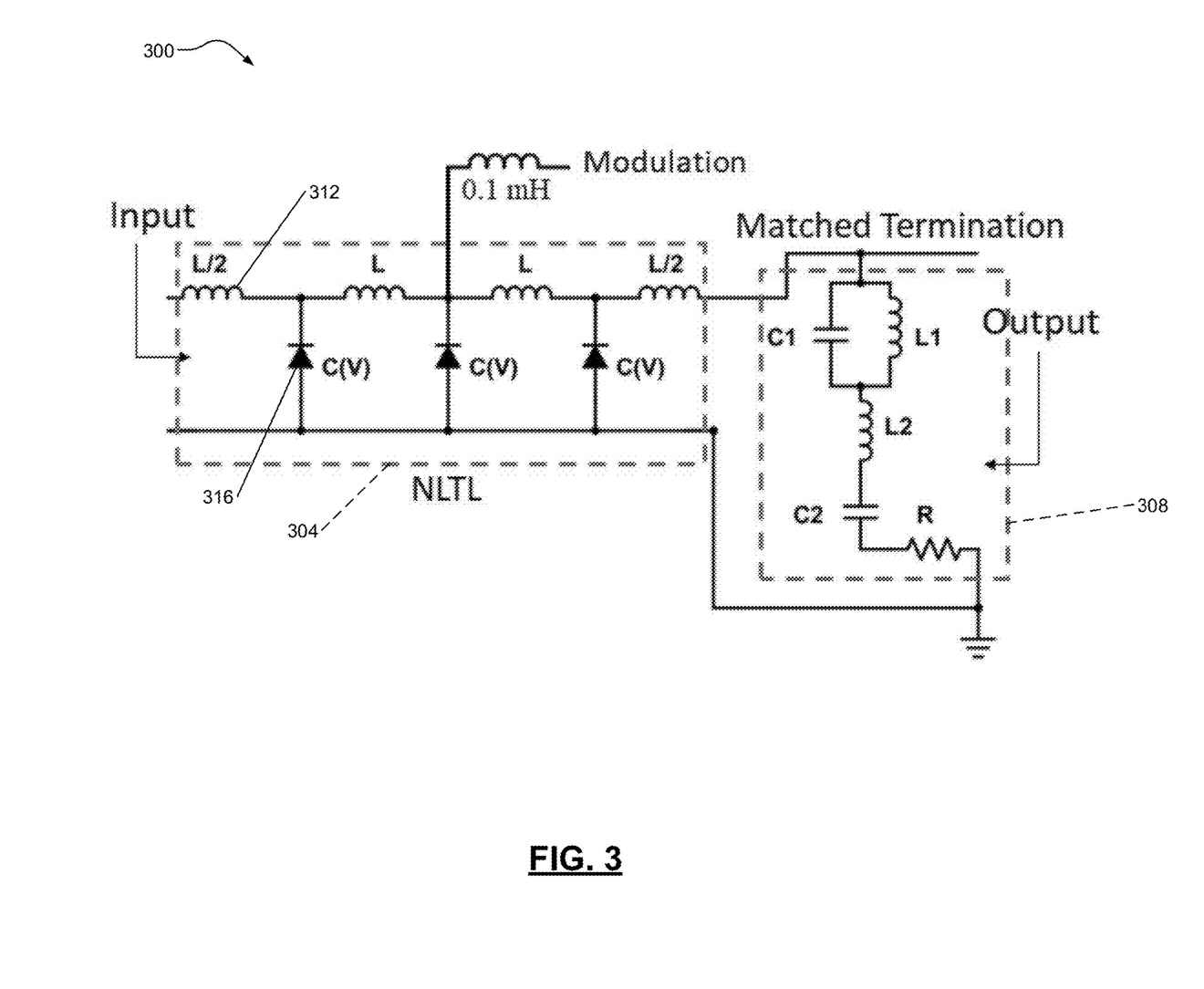
FIG. 3 is a schematic of a harmonic doubler (HD) implemented as a non-linear transmission line (NLTL) within an RFID tag.

Referring now to FIG. 3, a schematic of an example HD 300 is shown. In various implementations, the HD 300 consists of two parts: (i) an NLTL 304 and (ii) a matched termination circuit 308. The matched termination circuit 308 is used to match the impedance of the NLTL 304 with the impedance of the first antenna 108. The NLTL 304 is formed by series connecting inductors 312 and varactor diodes 316. The NLTL 304 is designed at a fundamental frequency ($f_0$). Depending upon the operating frequency of the NLTL 304 and the varactor diode 316, the inductor value can be determined. The output harmonic power is a function of the number of varactor diodes 316 used and the bias voltage. The second harmonic ($2f_0$) power increases with the number of varactor diodes 316.

The capacitance of the varactor diode 316 shows nonlinear behavior under different DC bias. The harmonics of the input $f_0$ signal are generated at the varactor diode 316 due to its inherent non-linearity. The varactor diode 316 should be biased at the nonlinear region of its C-V characteristics for maximum harmonic generation.

Once the bias point is determined, the inductance value is decided using impedance matching to a 50Ω load at 434 MHz ($f_0$). The varactor diode 316 shows maximum non-linearity close to its threshold voltage, where the depletion width is minimum. The DC sweep of the three stage NLTL 304 shows a maximum harmonic generation at 0.6 V forward bias. However, increasing the bias voltage further does not help as the varactor starts conducting losing its capacitance behavior. The NLTL 304 shows a maximum harmonic $2f_0$ generation of −25 dBm at 0.6 V bias compared to −51 dBm at 0 V bias at an input of −10 dBm at $f_0$. Therefore, an analog DC voltage 0.6 V may be used for digital state '1' and 0 V for digital state '0' to achieve an RF isolation of 26 dB in between harmonic 'on' and 'off' states. The modulation signal from the DMU is fed through a high impedance inductor of 0.1 mH to isolate the RF from the low frequency digital signal, as shown in FIG. 3.

The NLTL 304 is terminated with the $2f_0$ meandered antenna during wireless operation. However, the $2f_0$ antenna does not show a 50Ω input impedance at $f_0$. The impedance matching is not valid if the NLTL 304 is directly terminated with the $2f_0$ antenna. The matched termination circuit 308, as shown in FIG. 3, was designed to overcome the matching problem. The matched termination circuit 308 provides a 50Ω impedance match at $f_0$. Additionally, the matched termination circuit 308 includes a series resonator at $2f_0$ to prevent the drainage of harmonic power in the resistor. As an example implementation, the design parameters for the matched termination circuit 308 in FIG. 3 are C1=6.8 pF, L1=5 nH, C2=8.2 pF, L2=9 nH and R=50Ω.

Figure 4:
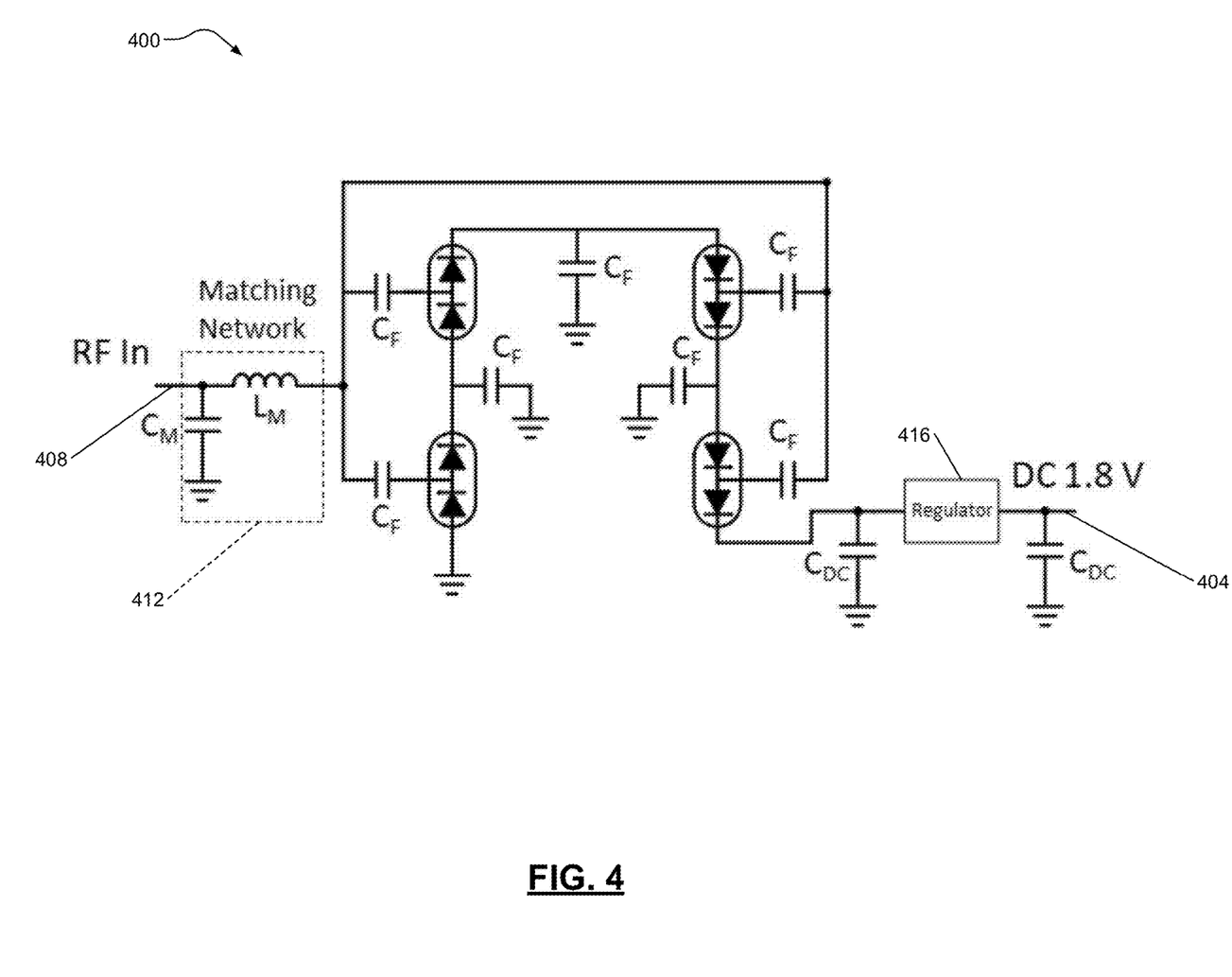
FIG. 4 is a schematic of an example energy harvesting unit (EHU) within an RFID tag.

FIG. 4 is a schematic of an example EHU 400. The EHU 400 provides the required DC power to drive the DMU at 404 and HD. In various implementations, a diode is required to rectify the RF power into DC power. Converting to DC power prevents the system from burning, as mentioned previously. As the RFID tag was intended to operate at very low received power (less than −5 dBm), the DC voltage level generated by a single rectifier is not enough to drive other modules. A voltage multiplier topology may be adopted to boost up the rectified voltage. A conventional Dickson charge pump configuration is shown in FIG. 4. The diodes are connected along a long chain of 8-stages in this configuration. The input signal 408 is fed in each stage through a capacitor, for example, CF=30 pF. An example matching network 412 with CM=10 pF and LM=26 nH to maximize the DC power generation at $f_0$ is shown. However, the DC voltage at the charge pump output is not regulated. Therefore, a 1.8 V Linear Drop Output (LDO) voltage regulator (TPS79718Q) by Texas Instruments is used to supply regulated DC voltage within the circuit. Two capacitors CDC=10 μF were used at the input and output of a voltage regulator 416 to maintain a stable DC supply and remove high frequency noises. The EHU 400 is capable of generating regulated 1.8 V at the minimum input power of −12 dBm. The voltage regulator 416 supplies a constant DC voltage to the DMU at 404 and the sensor. The range of the RFID tag from the interrogator necessarily depends upon the efficiency of the EHU 400.

In case of tags where further range is desired, the energy harvested by the EHU 400 may not be sufficient to power up the tag. In various implementations, a battery can be used to replace the EHU 400. The tag architecture in FIG. 1 changes by replacing the PS 116 and EHU 120 with a battery.

Figure 5:
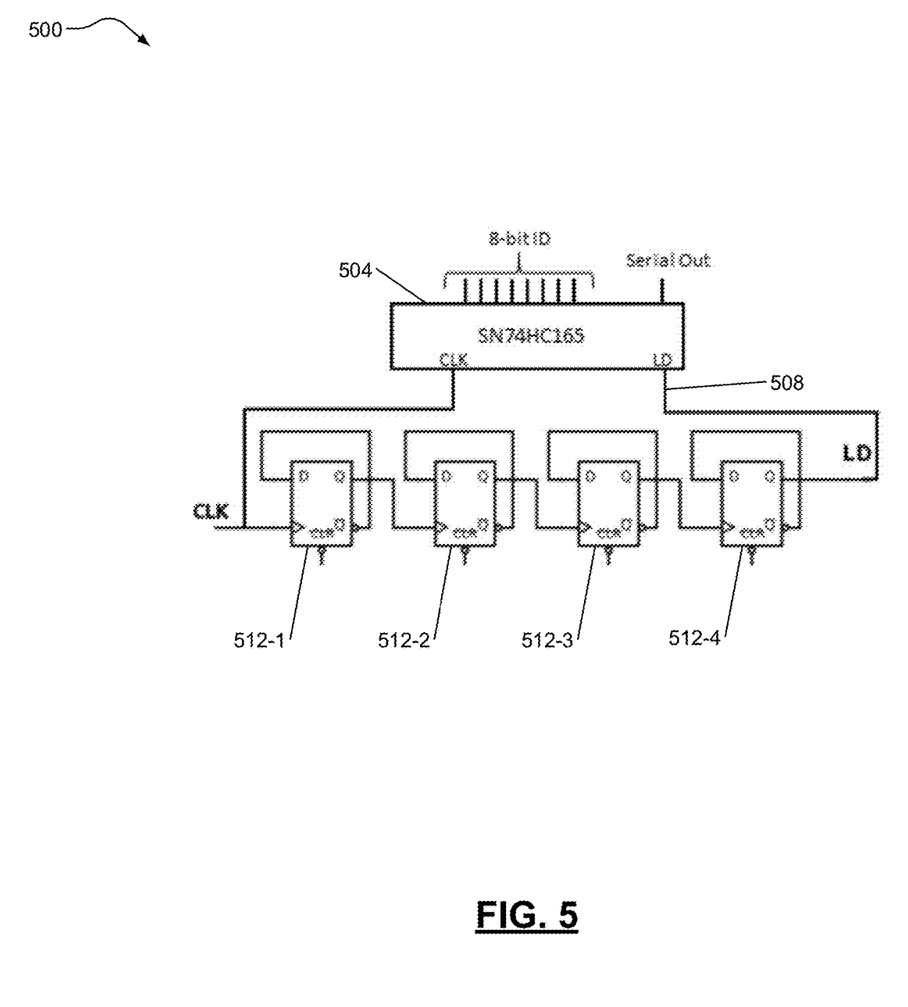
FIG. 5 is a schematic of an example digital modulation unit (DMU) within an RFID tag.

FIG. 5 depicts a schematic of an example DMU 500. The DMU 500 is responsible for modulating the HD using the digital signal produced by the sensor and the tag ID. The DMU 500 consists of an analog to digital converter (ADC) and a shift register. The ADC converts the analog signal from the sensor to an 'm' bit digital signal sequence. The 'n' bit ID is stored inside the non-volatile memory. Once the system is powered up, the 'm+n' bit data stream is fed into the shift register. The shift register is parallel to a serial data stream converter. In various implementations, an amplitude shift keying (ASK) modulation scheme is implemented for the system. The digital signal stream turns on and off the harmonic generation from the HD. Therefore, the HD is modulated according to the data stream from the sensor and the tag ID. Power is a critical issue for the whole modulation scheme. Increased modulation rate requires a high clock speed, which would need more power harvested from the EHU. That is, for a fast changing sensing unit, more power is harvested.

In the example implementation of FIG. 5, a simple architecture is used for the modulation scheme. The architecture uses a parallel to serial 8-bit shift register 504 to load up and transmit the stored tag ID. When an LD pin 508 of the shift register is activated, it loads the 8-bit ID parallelly and transmits serially upon deactivation of the LD pin 508. The LD signal should be deactivated for 8 clock periods as the shift register 504 sends 8 bit of data signal serially during that period. The complete DMU 500 circuit triggers at the rising edge of the clock. The in-phase LD signal was derived from the clock signal using four D flip-flops 512-1, 512-2, 512-3, and 512-4. For example, the low power D flip-flops 512-1, 512-2, 512-3, and 512-4 generate the LD signal at frequency fclk=8 KHz, where fclk is the frequency of the clock signal.

An ultra-low power oscillator integrated circuit may be used to generate the clock signal at 32 KHz. Each component of the DMU 500 may be designed to work at least at 1.8 V. However, the complete DMU 500 can work properly without bit loss at comparably lower DC voltage of 1.5 V. Implementation of the DMU 500 using the architecture of FIG. 5 would be cost and power effective and easy to implement compared to a microprocessor. The number of ID bits is scalable by using multiple shift registers and synchronizing the clock timing. Serial output from the shift register is fed to a voltage divider to convert the CMOS voltage levels into HD realizable voltage levels.

Figure 6:
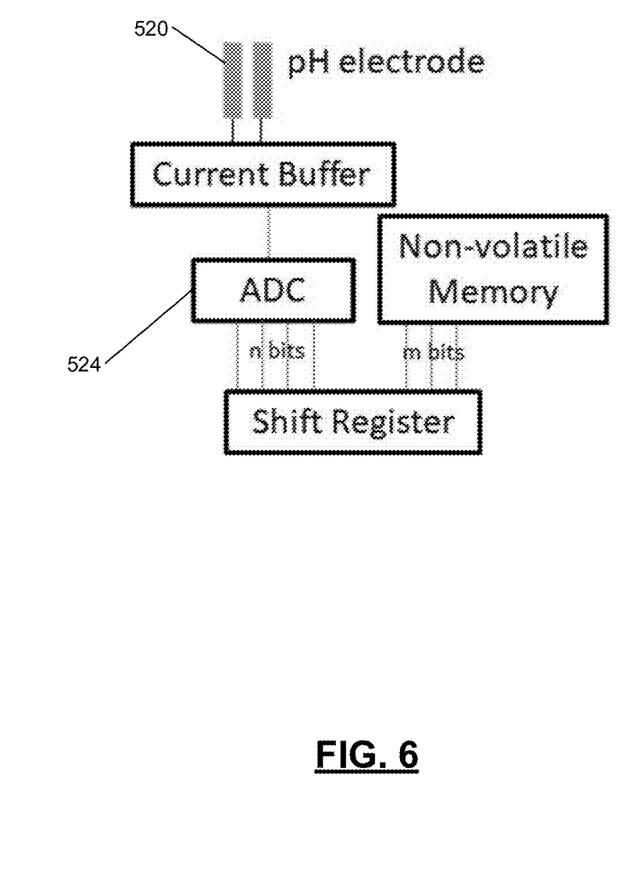
FIG. 6 is a schematic of an example pH sensor integrated within the DMU of an RFID tag.

Referring now to FIG. 6, a schematic of an example pH sensor integrated within the DMU of an RFID tag and implementation a current buffer circuit is shown. The potential of the harmonic tag as a sensor is demonstrated in FIG. 6. A commercial pH electrode 520 is used for a sensing element. The electrodes produce a bias voltage according to the pH in the environment. However, very low current generation is a major problem of the commercial pH electrodes. Hence, a high impedance current buffer circuit is required for proper functioning. In FIG. 6, the pH sensor integration with the RFID tag is shown in detail. The OP-Amps used in the current buffer circuit should have very high input impedance (>1 G$\Omega$) as the current produced by the pH electrodes 520 is very low. After the digitization in an ADC 524, the pH sensing signal along with the specific ID is ready for modulation of the harmonic generator.

In an example implementation, the pH electrode 520 as a sensing element includes two components: the pH sensor electrode pair (for example, the pH electrode 520) with an electronic readout circuit and an RF interrogator to activate the digital sensor and wirelessly extract identification information, such as an ID, and sensor information, such as data read by the sensor. The RF interrogator is used to activate the sensor (pH electrode 520) wirelessly and extract the sensor data, as described above with respect to the harmonic tag. The RF source of the interrogator generates a continuous RF signal fixed at a fundamental frequency, which is split equally in two branches using a power splitter. One signal branch is power amplified and transmitted through an antenna resonating at the fundamental frequency. Once the sensor replies with the modulated RF signal at a harmonic or subharmonic frequency, the reply signal is mixed with the other signal branch in an RF mixer to demodulate the sensor signal. In place of the memory and shift register in FIG. 6, a simple microcontroller based architecture can be implemented. In various implementations, the complete circuit along with the sensors can be co-fabricated in custom CMOS-like fabrication process.

Figure 7:
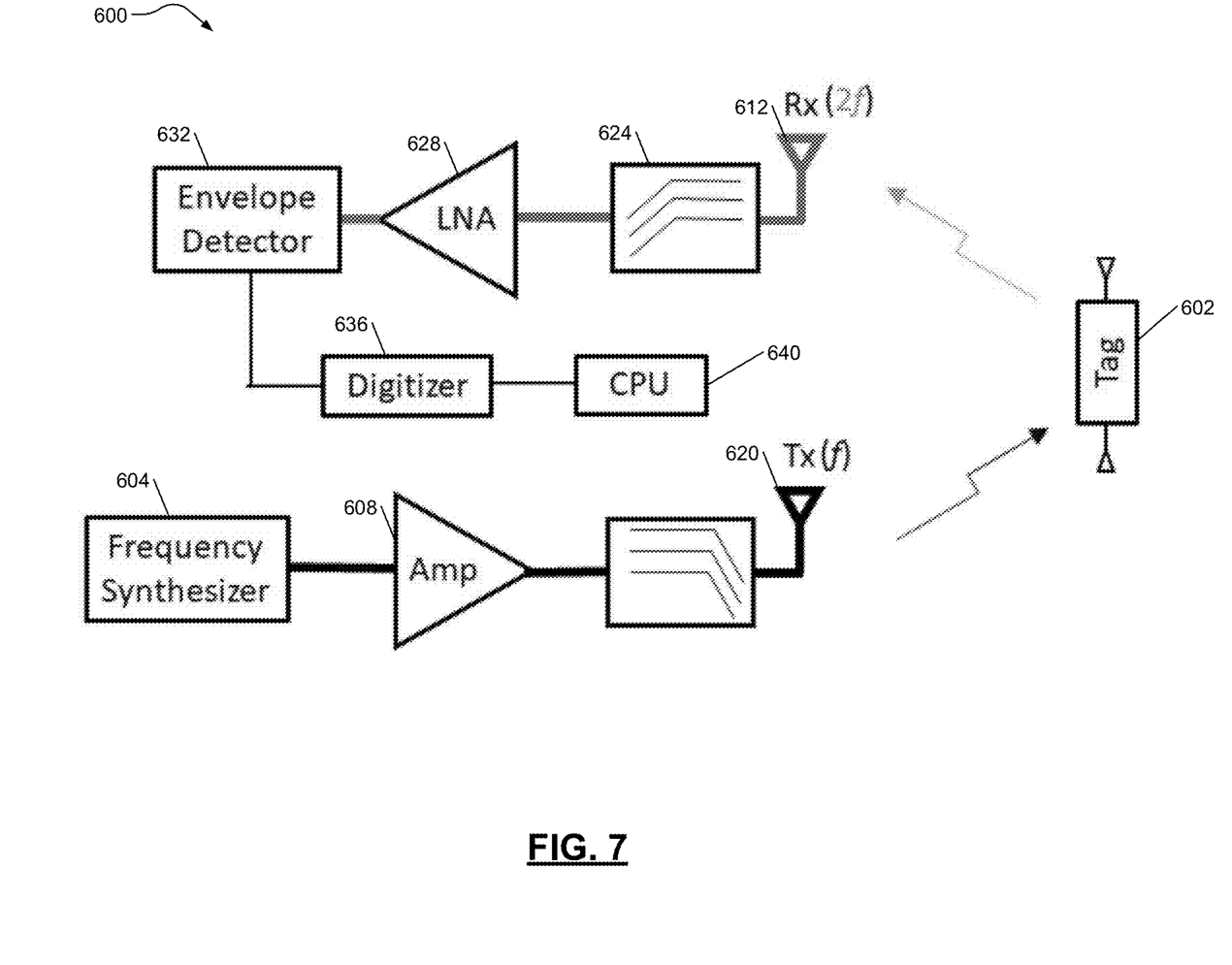
FIG. 7 is a schematic of an example implementation of an interrogator.

FIG. 7 is a schematic of an example implementation of an interrogator 600. The interrogator 600 may be designed and developed to read out the tag ID from a harmonic RFID tag 602. For example, a stable frequency synthesizer 604 can generate a fundamental signal ($f_0$) at 434 MHz. The $f_0$ may be amplified to 18 dBm by using a power amplifier (PA) 608. As a receiving antenna 612 works at second harmonic ($2f_0$) frequency, it is important to mitigate the transmission of harmonics, which are generated from the PA 608. A low-pass filter 616 with cut-off frequency of 500 MHz is used before feeding the PA 608 output to a high gain Yagi-Uda transmitting antenna 620.

If any harmonic RFID tag 602 is present within the illuminated area, the RFID tag 602 sends back the modulated $2f_0$ signal to the interrogator 600. Once the interrogator 600 receives harmonic $2f_0$ signal from the RFID tag 602, the signal is filtered in a high pass filter 624 to eliminate the clutter at $f_0$. It should be noted that the reduction of coupling in between receiving and transmitting antenna at both $f_0$ and $2f_0$ would enhance the signal to clutter ratio, antenna performance, and the maximum detectable range. In addition to the filters and narrow band antennas, the transmitting antenna 620 and receiving antenna 612 were aligned in a cross-polarization position for minimum coupling. The received weak RF signal at $2f_0$ was then amplified in a low noise amplifier 628 before feeding it to an envelope detector 632. As the modulation was a simple ASK, a diode detector may be used for the envelope detection. In a subsequent stage, an RC low pass filter may be used to obtain only low frequency ID signal and remove the high frequency RF signal. The time domain demodulated sampled data is acquired from a digitizer 636, further signal processing is performed to improve the SNR and shape the pulse bits before storing in a CPU 640.

Different digital modulation schemes apart from simple ASK can be used to modulate the harmonic module. In various implementations, the modulation can include phase shift keying (PSK) or subharmonic harmonic shift keying (SHSK) taking advantage of multiple harmonic and subharmonic generation. In PSK, two different phase shift units are used representing on and off switching. In SHSK, a digital '1' signal is denoted by the second harmonic and a digital '0' is denoted by the first subharmonic signal. Phase provides important information regarding the distance of the tag and an important element for coherence detection. For example, the phase can be captured if additional digital code is introduced in the interrogator 600. Instead of sending a continuous single frequency, the interrogator 600 can send a digital code, linear frequency modulation (LFM) of the carrier signal. Modification to the interrogator 600 signal would provide phase information as well as improve the SNR.

The interrogator 600 is not limited to sensing and identifying a remotely located sensor. Other capabilities such as distance estimation can be incorporated in the interrogator 600, which is critical for phase estimation. Some sensing applications may require phase information in addition to the modulation bit generation. Additionally, the location of a sensor is required to be detected within a hazardous environment. The location of the sensor can be known from estimating the distance between the RFID tag and interrogator. Distance estimation is another part of the interrogator system. In various implementations, phase-based distance estimation techniques are used. However, when phase is unknown, frequency shift-based distance estimation methodology may be used.

In next five years, there is an estimated 19.21% compound annual growth rate of RFID devices in the electronic payment market. For at least this reason, there is a need to procure data securely from RFID sensors. A tamper-proof secured RFID tag may be implemented using a variety of techniques, such as a digital technique and an RF technique. An extra layer of authentication can be added to existing RFID tags by monitoring multiple harmonics. As there will always be tolerance in the components used to design the NLTL, there also will always be different mismatch in the impedance of a single NLTL stage resulting in a different amplitude level and phase of the received harmonic levels. The different higher order harmonics would be a unique signature of the specific RFID tag under identical excitation modulation signals. The power level and the phase difference of the higher order harmonics is stored for a specific RFID tag, which is verified during RFID tag activation. In this way, a secured RFID tag communication can be achieved RF-wise. In the RF implementation, a wide band antenna capable of transmitting multiple harmonics is necessary for both the RFID tag side and the reader side.

Figure 8:
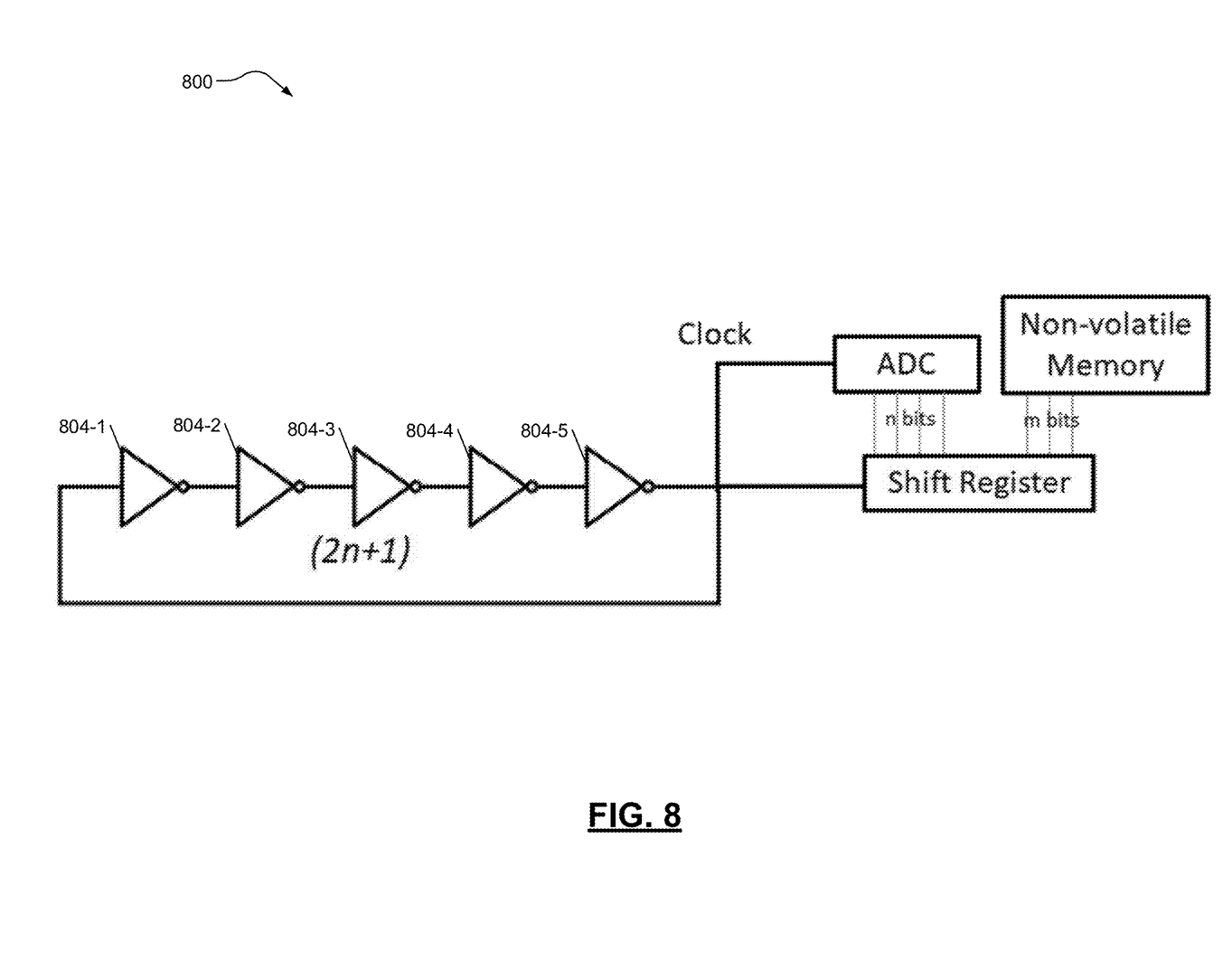
FIG. 8 is a schematic of an example clock synthesizer to create a digital watermark of an RFID tag.

For digital implementation, the extra authentication layer is achieved digitally using the clock generator of the shift register and ADC or microcontroller inside the tag. Referring now to FIG. 8, a schematic of an example clock synthesizer 800 to create a digital watermark of an RFID tag is shown. Due to manufacturing variation, the propagation delay of a single inverter is always different. If an odd number of inverters 804-1, 804-2, 804-3, 804-4, and 804-5 are connected in series, as shown in FIG. 8, the propagation delay is cumulated and every clock synthesizer would have a unique frequency of oscillation. When the digital sequence is analyzed after demodulation at the reader or interrogator, a single period of the ID sequence is read. The measuring of the period would be unique to each RFID tag and can be associated with the specific ID. For a counterfeited RFID tag, if the ID sequence is duplicated, the inherent clock period cannot be the same as the original tag. Therefore, a secured RFID tag is implemented digitally. In various implementations, the RFID tag may be secured by both digital and RF watermarks.

Figure 9A:
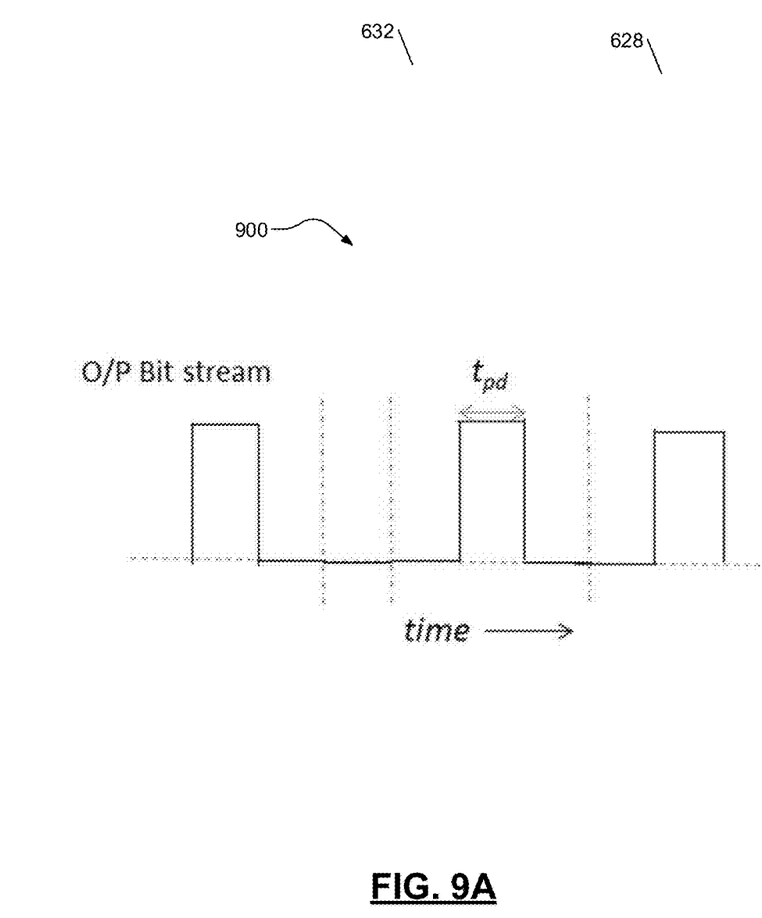
FIG. 9A is a graphical depiction of a digital watermark of an RFID tag across the time domain.
Figure 9B:
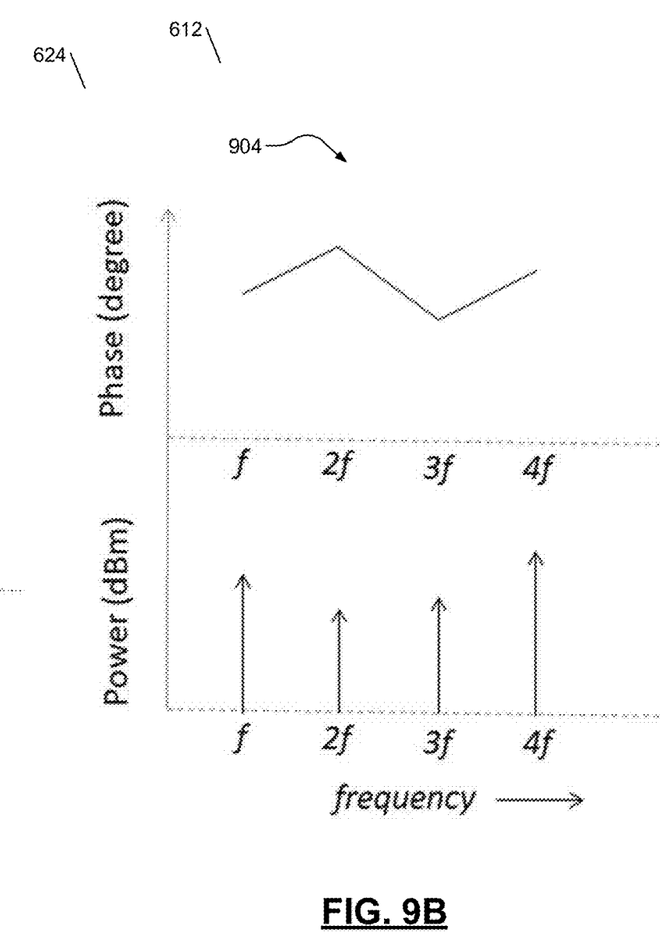
FIG. 9B is a graphical depiction of power and phase of an RF watermark of an RFID tag across the frequency domain.

FIGS. 9A and 9B are graphical depictions of a digital watermark of an RFID tag across the time domain as well as power and phase of an RF watermark of the RFID tag across the frequency domain. The digital and RF watermarks read by an interrogator (such as the interrogator described in FIG. 1) are presented for time domain 900 and frequency domain 904, respectively. The time period ($t_{pd}$) of a single bit in the output ID bit-stream is the digital watermark 900 and the output harmonic power and phase are the RF watermark 904 of the RFID tag.

Figure 10:
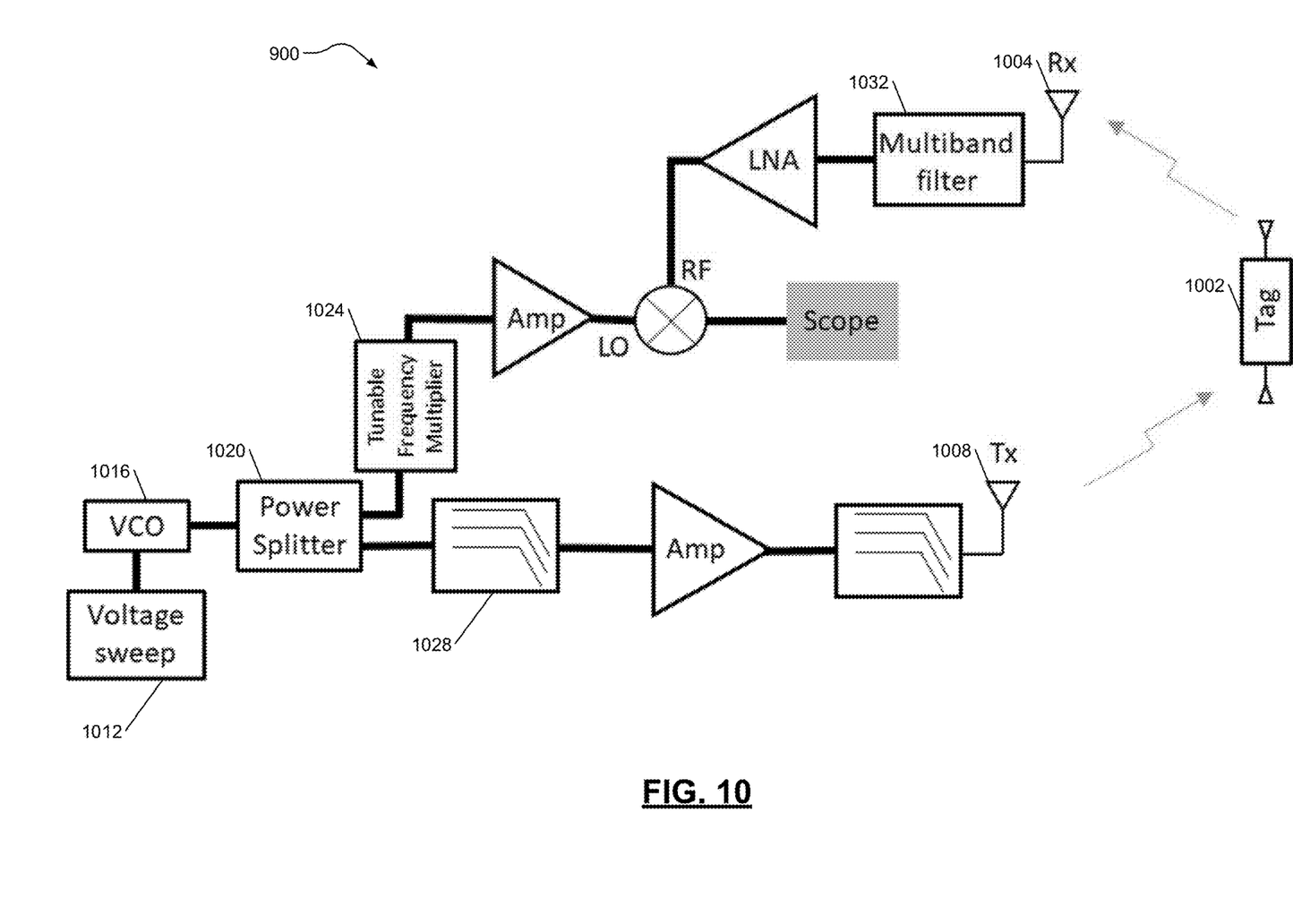
FIG. 10 is a depiction of a functional block diagram of an interrogator that monitors higher order harmonics.

The RF interrogator shown in FIG. 7 is an asynchronous type. To obtain the modulation baseband signal at different harmonics and subharmonics with additional phase information, the RF interrogator should be synchronous type. Referring now to FIG. 10, a depiction of a functional block diagram of an interrogator 1000 that monitors higher order harmonics is shown. The interrogator 1000 communicates with an RFID tag 1002 and includes a receiver antenna 1004 and a transmitter antenna 1008. In various implementations, a transceiver antenna may be used. A voltage sweep component 1012 instructs an oscillator 1016 to periodically adjust the voltage provided to the interrogator 1000. A power splitter 1020 divides the voltage between a tunable frequency multiplier 1024 and a low pass filter 1028. The tunable frequency multiplier 1024 up-converts or down-converts the divided signal. Then, the received signal at the specified harmonic or subharmonic from the RFID tag 1002 can be selectively demodulated using a multiband filter 1032 when received via the receiver antenna 1004.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip. While various embodiments have been disclosed, other variations may be employed. All of the components and function may be interchanged in various combinations. It is intended by the following claims to cover these and any other departures from the disclosed embodiments which fall within the true spirit of this invention.

What is claimed is:

1. A harmonic tag system, comprising:
a harmonic tag;
a first antenna configured to receive a fundamental signal and transmit an identifier of the harmonic tag at a fundamental frequency;
an energy harvesting unit configured to convert the fundamental signal into power, wherein the power activates a sensor;
a harmonic doubler configured to generate a harmonic signal at a harmonic frequency based on (i) the fundamental signal and (ii) a sequence, wherein the harmonic frequency is double the fundamental frequency; and
a digital modulation unit configured to selectively trigger an activation of the harmonic doubler, wherein the harmonic doubler is triggered sequentially in an off state and an on state, and wherein the digital modulation unit produces the sequence; and
a second antenna configured to transmit data of the sensor at the harmonic frequency.

2. The harmonic tag system of claim 1 wherein the harmonic doubler is further configured to generate a plurality of harmonic frequencies and a plurality of subharmonic frequencies, and wherein the plurality of harmonic frequencies and the plurality of subharmonic frequencies transmit additional information.

3. The harmonic tag system of claim 1 further comprising a battery configured to provide additional power to activate the sensor.

4. The harmonic tag system of claim 1 wherein the first antenna and the second antenna are included in a transceiver.

5. The harmonic tag system of claim 1 further comprising a power splitter configured to receive the fundamental signal via the first antenna and split the received fundamental signal between the energy harvesting unit and the harmonic doubler.

6. The harmonic tag system of claim 1 further comprising a clock synthesizer including a plurality of inverters configured to create a digital watermark of the harmonic tag based on a cumulative propagation delay of the plurality of inverters, wherein the cumulative propagation delay results in the fundamental frequency being a unique frequency of oscillation.

7. The harmonic tag system of claim 1 further comprising one or more additional sensors, wherein the harmonic doubler is configured to generate harmonic frequencies corresponding to each of the one or more additional sensors and transmit data of each of the one or more additional sensors at each corresponding frequency, and wherein each corresponding frequency is different.

8. The harmonic tag system of claim 1 further comprising an interrogator configured to:

transmit the fundamental signal to the first antenna of the harmonic tag; and receive, from the second antenna of the harmonic tag, the identifier at the fundamental frequency and the data of the sensor at the harmonic frequency.

9. The harmonic tag system of claim 8 wherein the interrogator includes a frequency synthesizer configured to generate a transmit frequency at a coded time interval frequency for transmission to the harmonic tag, and wherein the interrogator is configured to:

receive multiple harmonic and subharmonics from the harmonic tag;

differentiate between the multiple harmonic and subharmonics; and identify a watermark from the harmonic tag.

10. The harmonic tag system of claim 9 wherein the frequency synthesizer is configured to generate multiple frequencies at a specific chirp rate for enhanced phase tracking and transmission to the harmonic tag.

11. The harmonic tag system of claim 9 wherein the interrogator includes an amplifier configured to amplify the transmit frequency prior to transmission via a transmit antenna.

12. The harmonic tag system of claim 9 further comprising at least one processor and associated memory, wherein the at least one processor is configured to:

receive data of the sensor and the identifier via a receive antenna configured to receive a reflected fundamental frequency and the harmonic frequency; and store the received data of the sensor corresponding to the identifier.

13. The harmonic tag system of claim 9 wherein the interrogator is configured to transmit the fundamental signal at predetermined intervals.

14. A method of transmitting sensor data, comprising:

receiving, at a tag, an interrogation signal at a fundamental frequency, the fundamental frequency of the tag has a unique watermark based on a cumulative propagation delay of a plurality of inverters, and wherein the cumulative propagation delay results in the fundamental frequency being a unique frequency of oscillation;

activating a sensor with power from the interrogation signal;

generating a harmonic signal at a harmonic frequency using the interrogation signal and a sequence, wherein the sequence is produced by selectively triggering activation of a harmonic doubler; and transmitting, to an interrogator, an identifier associated with the tag at the fundamental frequency and data of the sensor at the harmonic frequency.

15. The method of claim 14 wherein the harmonic doubler is triggered sequentially in an off state and an on state to produce the sequence.

16. The method of claim 14 wherein the harmonic frequency is double the fundamental frequency.

17. A harmonic interrogator system comprising:

a harmonic tag including:

a sensor configured to monitor environment data;

a transceiver configured to receive a fundamental signal and transmit an identifier of the harmonic tag at a fundamental frequency;

an energy harvesting unit configured to convert the fundamental signal into power, wherein the power activates the sensor;

a harmonic doubler configured to generate a harmonic signal at a harmonic frequency based on (i) the fundamental signal and (ii) a sequence; and a digital modulation unit configured to selectively trigger an activation of the harmonic doubler, wherein the harmonic doubler is triggered sequentially in an off state and an on state, and wherein the digital modulation unit produces the sequence, wherein the transceiver is configured to transmit the monitored environment data of the sensor at the harmonic frequency; and an interrogator including a frequency synthesizer configured to generate at least one of (i) a single frequency at a coded time interval frequency and (ii) multiple frequencies at a specific chirp rate for enhanced phase tracking, wherein the interrogator is configured to:

receive multiple harmonic and subharmonics from the harmonic tag;

differentiate between the multiple harmonic and subharmonics; and identify a watermark from the harmonic tag.

18. The harmonic interrogator system of claim 17 wherein the monitored environment data includes at least one of: (i) a pH level, (ii) a gasoline level, (iii) a water level, and (iv) a gravitational force.

19. The harmonic interrogator system of claim 17 wherein the interrogator and the harmonic tag are configured to operate as at least one of: (i) a far-field communication system and (ii) a near-field communication system.

20. The harmonic interrogator system of claim 17 wherein the harmonic frequency is double the fundamental frequency.

* * * * *